(12) United States Patent
Snuffin et al.

(10) Patent No.: US 12,458,934 B2
(45) Date of Patent: *Nov. 4, 2025

(54) HIGH-CAPACITY POLYMER SYSTEM AND METHOD OF PREPARING POLYMERIC MIXTURES

(71) Applicant: UGSI Chemical Feed, Inc., Poway, CA (US)

(72) Inventors: Michael Snuffin, Berlin, NJ (US); Yong H. Kim, Tinley Park, IL (US); Eric A. Maier, Pitman, NJ (US); Troy Litherland, Bourbonnais, IL (US)

(73) Assignee: UGSI Chemical Feed, Inc., Poway, CA (US)

( * ) Notice: Subject to any disclaimer, the term of this patent is extended or adjusted under 35 U.S.C. 154(b) by 1043 days.

This patent is subject to a terminal disclaimer.

(21) Appl. No.: 17/397,306

(22) Filed: Aug. 9, 2021

(65) Prior Publication Data

US 2021/0362103 A1 Nov. 25, 2021

Related U.S. Application Data

(63) Continuation of application No. 16/275,735, filed on Feb. 14, 2019, now Pat. No. 11,097,231, which is a
(Continued)

(51) Int. Cl.
| | | |
|---|---|---|
| *B01F 3/12* | (2006.01) | |
| *B01F 5/00* | (2006.01) | |
| *B01F 7/16* | (2006.01) | |
| *B01F 7/22* | (2006.01) | |
| *B01F 13/10* | (2006.01) | |
| *B01F 15/00* | (2006.01) | |
| *B01F 15/02* | (2006.01) | |
| *B01F 23/50* | (2022.01) | |
| *B01F 23/53* | (2022.01) | |

(Continued)

(52) U.S. Cl.
CPC .......... *B01F 23/53* (2022.01); *B01F 23/54* (2022.01); *B01F 23/59* (2022.01); *B01F 25/102* (2022.01); *B01F 27/808* (2022.01); *B01F 27/811* (2022.01); *B01F 27/91* (2022.01); *B01F 33/8212* (2022.01); *B01F 35/55* (2022.01); *B01F 35/71731* (2022.01); *B01F 2101/2805* (2022.01)

(58) Field of Classification Search
CPC .......... B01F 2101/2805; B01F 23/53; B01F 33/8212

See application file for complete search history.

(56) References Cited

U.S. PATENT DOCUMENTS

| | | |
|---|---|---|
| 4,077,612 A | 3/1978 | Ricciardi |
| 4,529,321 A | 7/1985 | Berchoux |

(Continued)

*Primary Examiner* — Elizabeth Insler
(74) *Attorney, Agent, or Firm* — The Webb Law Firm

(57) ABSTRACT

A system for preparing a polymeric mixture includes: a containment device configured to distribute dry polymeric materials; a receiving chamber in fluid communication with the containment device; a wetting bowl; a dispersing channel; and a mixing chamber connected to the dispersing channel. A method of preparing a polymeric mixture includes distributing water and dry polymeric materials through the various components of the system and mixing the materials with the mechanical mixing device.

18 Claims, 12 Drawing Sheets

Related U.S. Application Data continuation of application No. 15/923,603, filed on Mar. 16, 2018, now Pat. No. 10,213,753.

(60) Provisional application No. 62/472,221, filed on Mar. 16, 2017.

(51) Int. Cl.

| | | |
|---|---|---|
| *B01F 25/10* | (2022.01) | |
| *B01F 27/808* | (2022.01) | |
| *B01F 27/81* | (2022.01) | |
| *B01F 27/91* | (2022.01) | |
| *B01F 33/82* | (2022.01) | |
| *B01F 35/00* | (2022.01) | |
| *B01F 35/71* | (2022.01) | |
| *B01F 101/00* | (2022.01) | |

(56) References Cited

U.S. PATENT DOCUMENTS

| | | | |
|---|---|---|---|
| 4,603,156 A | 7/1986 | Sortwell | |
| 4,643,582 A | 2/1987 | Ricciardi | |
| 4,688,945 A | 8/1987 | Brazelton et al. | |
| 5,018,871 A * | 5/1991 | Brazelton | B01F 27/1123 366/178.3 |
| 5,344,619 A | 9/1994 | Larwick et al. | |
| 5,407,975 A * | 4/1995 | Pardikes | C02F 1/5227 528/499 |
| 5,599,102 A | 2/1997 | Hamada et al. | |
| 5,879,080 A | 3/1999 | Pardikes | |
| 6,019,498 A | 2/2000 | Hamada et al. | |
| 6,218,466 B1 | 4/2001 | Hamada et al. | |
| 7,331,540 B2 | 2/2008 | Klaumunzner | |
| 7,404,665 B2 * | 7/2008 | Bacher | B29C 48/92 366/76.9 |
| 7,484,453 B2 * | 2/2009 | Kammerloher | C12C 7/04 99/278 |
| 7,500,778 B2 | 3/2009 | Brazelton | |
| 9,452,395 B2 | 9/2016 | Jeronimo et al. | |
| 10,737,226 B2 | 8/2020 | Trahan et al. | |
| 2004/0008571 A1 | 1/2004 | Coody et al. | |
| 2005/0013892 A1 | 1/2005 | Downs et al. | |
| 2009/0169456 A1 | 7/2009 | Yang et al. | |
| 2009/0268547 A1 | 10/2009 | Pardikes | |
| 2010/0027371 A1 | 2/2010 | Lucas et al. | |
| 2013/0206876 A1 | 8/2013 | Kerns | |
| 2013/0258799 A1 | 10/2013 | Christy et al. | |
| 2013/0337523 A1 | 12/2013 | Heathcote et al. | |
| 2019/0168176 A1 | 6/2019 | Anderson et al. | |
| 2020/0038825 A1 | 2/2020 | Weeter et al. | |

* cited by examiner

HIGH-CAPACITY POLYMER SYSTEM AND METHOD OF PREPARING POLYMERIC MIXTURES

CROSS REFERENCE TO RELATED APPLICATIONS

This application is a continuation of U.S. patent application Ser. No. 16/275,735, filed Feb. 14, 2019, which is a continuation of U.S. patent application Ser. No. 15/923,603, filed Mar. 16, 2018, which issued as U.S. Pat. No. 10,213,753 on Feb. 26, 2019, entitled "High-Capacity Polymer System and Method of Preparing Polymeric Mixtures", which claims priority to U.S. Provisional Application No. 62/472,221 filed Mar. 16, 2017, each of which are incorporated herein by reference in their entirety.

BACKGROUND OF THE INVENTION

Field of the Invention

The present invention relates to systems and methods for mixing polymeric materials with water to create a polymeric mixture.

Description of Related Art

Polymeric slurries, which are also referred to as polymeric dispersions, are used in numerous applications, such as in the formation of coatings, drilling fluids, water purification additives, and the like. Polymeric slurries are generally prepared by mechanically mixing dry polymeric powders with water. For instance, dry polymeric powder and water are typically fed at a controlled rate into a mixing chamber where the components are mechanically mixed to form a slurry or a solution. While such mixing processes are commonly utilized to produce polymeric slurries, the final slurries often contain undesirable agglomerates of polymeric material.

Various systems and methods have been developed to reduce or prevent agglomeration of the polymeric materials. For example, some processes use low-capacity mixing in which dry polymeric powders and water are slowly added into the mixing chamber, while other processes use chemical additives that help separate the polymeric materials from each other during mixing. Although these approaches help to reduce or prevent the polymeric materials from agglomerating, they also have various deficiencies and drawbacks. For instance, low-capacity mixing processes slow down production, and chemical additives increase overall production costs. Thus, it is desirable to provide an improved system and method for preparing polymeric slurries.

SUMMARY OF THE INVENTION

In certain non-limiting embodiments, the present invention is directed to a system for preparing a polymeric mixture. The system includes: a containment device configured to distribute dry polymeric materials; a receiving chamber in fluid communication with the containment device; a wetting bowl connected to the receiving chamber; a dispersing channel in fluid communication with the wetting bowl; and a mixing chamber connected to the dispersing channel. Further, the mixing chamber includes: (i) a first end comprising an opening; (ii) a second end located opposite the first end; (iii) a mechanical mixing device positioned between the first end and the second end; (iv) at least one water inlet port formed through a body of the mixing chamber between the first end and the mechanical mixing device; (v) at least one discharge port formed through a body of the mixing chamber between the second end and the water inlet port; and (vi) a funnel-shaped distribution apparatus extending from the first end of the mixing chamber to the mechanical mixing device. Further, a portion of an outside diameter of the funnel-shaped distribution apparatus decreases from the first end of the mixing chamber. In some non-limiting embodiments, the receiving chamber comprises a retractable shut-off gate configured to control the distribution of the dry polymeric materials into the receiving chamber.

Moreover, in certain non-limiting embodiments, the wetting bowl comprises: an inlet end; an outlet end positioned opposite the inlet end; a first body portion extending from the inlet end, the first body portion having a substantially constant inside diameter; a second body portion extending from the first body portion, the second body portion having a decreasing inside diameter; and a third body portion extending from the second body portion to the outlet end, the third body portion having a substantially constant inside diameter that is smaller than the inside diameter of the first body portion. The third body portion of the wetting bowl can also extend into the dispersing channel. In some non-limiting embodiments, the wetting bowl includes at least two water inlet ports that are formed through the first body portion of the wetting bowl.

In addition, in certain non-limiting embodiments, at least a portion of the dispersing channel is made of a plastic material such as a substantially transparent plastic material for example. The dispersing channel can also comprise a water inlet port. In some non-limiting embodiments, a baffle is positioned below the water inlet port of the dispersing channel.

In some non-limiting embodiments, the mixing chamber further comprises: (1) a first horizontal internal wall positioned below the mechanical mixing device; and (2) a second horizontal internal wall positioned above the mechanical mixing device. In such embodiments, the second horizontal internal wall comprises passages that allow water to pass through, and the funnel-shaped distribution apparatus extends through the second horizontal internal wall to allow the polymeric materials to flow to the mechanical mixing device. In certain non-limiting embodiments, the water inlet port is positioned between the first end of the mixing chamber and the second horizontal internal wall, and the water discharge port is positioned between the first horizontal internal wall and the second horizontal internal wall.

In certain non-limiting embodiments, the present invention is also directed to a method of preparing a polymeric mixture. The method can include: distributing dry polymeric materials into a receiving chamber from a containment device; distributing the dry polymeric materials into a wetting bowl from the receiving chamber; distributing the polymeric materials from the wetting bowl, through a dispersing channel, and into a mixing chamber comprising a mechanical mixing device; directing the polymeric materials to the mechanical mixing device with a funnel-shaped distribution apparatus in which a portion of an outside diameter of the funnel-shaped distribution apparatus decreases from a first end of the mixing chamber; transporting water into the mixing chamber with at least one water inlet port formed through a side of the first end of the mixing chamber; and mixing the polymeric materials and water with the mechanical mixing device to form a polymeric mixture.

In some non-limiting embodiments, the method further includes discharging the polymeric mixture through at least one discharge port and, optionally, transporting the discharged polymeric mixture to at least one storage tank. The method can also use a retractable shut-off gate to control the distribution of dry polymeric materials into the receiving chamber. In such embodiments, the retractable shut-off gate automatically opens to allow the dry polymeric materials into the receiving chamber during operation. The method can also include a step of transporting water into the wetting bowl through at least two water inlet ports that are formed through the first body portion of the wetting bowl. Further, at least a portion of the water exiting the outlet end of the wetting bowl can radially spray onto an interior wall of the dispersing channel.

In certain non-limiting embodiments, the method further includes distributing water into the dispersing channel through a water inlet port. At least a portion of the water distributed through the water inlet port of the dispersing channel can flow over a baffle and into the mixing chamber.

In some non-limiting embodiments, the mixing chamber further comprises: (1) a first horizontal internal wall positioned below the mechanical mixing device; and (2) a second horizontal internal wall positioned above the mechanical mixing device. In such embodiments, the second horizontal internal wall comprises passages that allow water to pass through, and the funnel-shaped distribution apparatus extends through the second horizontal internal wall to allow the polymeric materials to flow to the mechanical mixing device.

Further non-limiting embodiments or aspects are set forth in the following numbered clauses.

Clause 1: A system for preparing a polymeric mixture comprising: a containment device configured to distribute dry polymeric materials; a receiving chamber in fluid communication with the containment device; a wetting bowl connected to the receiving chamber; a dispersing channel in fluid communication with the wetting bowl; and a mixing chamber connected to the dispersing channel, the mixing chamber comprising: (i) a first end comprising an opening; (ii) a second end located opposite the first end; (iii) a mechanical mixing device positioned between the first end and the second end; (iv) at least one water inlet port formed through a body of the mixing chamber between the first end and the mechanical mixing device; (v) at least one discharge port formed through a body of the mixing chamber between the second end and the water inlet port; and (vi) a funnel-shaped distribution apparatus extending from the first end of the mixing chamber to the mechanical mixing device, wherein a portion of an outside diameter of the funnel-shaped distribution apparatus decreases from the first end of the mixing chamber.

Clause 2: The system of clause 1, wherein the receiving chamber comprises a retractable shut-off gate configured to control the distribution of the dry polymeric materials into the receiving chamber.

Clause 3: The system of clauses 1 or 2, wherein the wetting bowl comprises: an inlet end; an outlet end positioned opposite the inlet end; a first body portion extending from the inlet end, the first body portion having a substantially constant outside diameter; a second body portion extending from the first body portion, the second body portion having a decreasing outside diameter; and a third body portion extending from the second body portion to the outlet end, the third body portion having a substantially constant outside diameter that is smaller than the outside diameter of the first body portion.

Clause 4: The system of any of clauses 1-3, wherein the third body portion of the wetting bowl extends into the dispersing channel.

Clause 5: The system of any of clauses 1-4, wherein the wetting bowl further comprises at least two water inlet ports that are formed through the first body portion of the wetting bowl.

Clause 6: The system of any of clauses 1-5, wherein at least a portion of the dispersing channel is made of a plastic material.

Clause 7: The system of any of clauses 1-6, wherein at least a portion of the dispersing channel comprises a substantially transparent plastic material.

Clause 8: The system of any of clauses 1-7, wherein the dispersing channel comprises a water inlet port.

Clause 9: The system of any of clauses 1-8, wherein the dispersing channel further comprises a baffle positioned below the water inlet port of the dispersing channel.

Clause 10: The system of any of clauses 1-9, wherein the mixing chamber further comprises: (1) a first horizontal internal wall positioned below the mechanical mixing device; and (2) a second horizontal internal wall positioned above the mechanical mixing device, wherein the second horizontal internal wall comprises passages that allow water to pass through, and wherein the funnel-shaped distribution apparatus extends through the second horizontal internal wall to allow the polymeric materials to flow to the mechanical mixing device.

Clause 11: The system of any of clauses 1-10, wherein the water inlet port is positioned between the first end of the mixing chamber and the second horizontal internal wall, and the water discharge port is positioned between the first horizontal internal wall and the second horizontal internal wall.

Clause 12: A method of preparing a polymeric mixture comprising: distributing dry polymeric materials into a receiving chamber from a containment device; distributing the dry polymeric materials into a wetting bowl from the receiving chamber; distributing the polymeric materials from the wetting bowl, through a dispersing channel, and into a mixing chamber comprising a mechanical mixing device; directing the polymeric materials to the mechanical mixing device with a funnel-shaped distribution apparatus, wherein a portion of an outside diameter of the funnel-shaped distribution apparatus decreases from a first end of the mixing chamber; transporting water into the mixing chamber with at least one water inlet port formed through a side of the first end of the mixing chamber; and mixing the polymeric materials and water with the mechanical mixing device to form a polymeric mixture.

Clause 13: The method of clause 12, further comprising discharging the polymeric mixture through at least one discharge port.

Clause 14: The method of clauses 12 or 13, wherein a retractable shut-off gate is automatically opened to allow the dry polymeric materials into the receiving chamber.

Clause 15: The method of any of clauses 12-14, wherein the wetting bowl comprises: an inlet end; an outlet end positioned opposite the inlet end; a first body portion extending from the inlet end, the first body portion having a substantially constant outside diameter; a second body portion extending from the first body portion, the second body portion having a decreasing outside diameter; and a third body portion extending from the second body portion to the outlet end, the third body portion having a substantially constant outside diameter that is smaller than the inner diameter of the first body portion.

Clause 16: The method of any of clauses 12-15, further comprising transporting water into the wetting bowl through at least two water inlet ports that are formed through the first body portion of the wetting bowl.

Clause 17: The method of any of clauses 12-16, wherein at least a portion of the water exiting the outlet end of the wetting bowl radially sprays onto an interior wall of the dispersing channel.

Clause 18: The method of any of clauses 12-17, further comprising distributing water into the dispersing channel through a water inlet port.

Clause 19: The method of any of clauses 12-18, wherein at least a portion of the water distributed through the water inlet port of the dispersing channel flows over a baffle and into the mixing chamber.

Clause 20: The method of any of clauses 12-19, wherein the water inlet port is positioned between the first end of the mixing chamber and the second horizontal internal wall, and the water discharge port is positioned between the first horizontal internal wall and the second horizontal internal wall.

These and other features and characteristics of the present invention, as well as the parts, and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
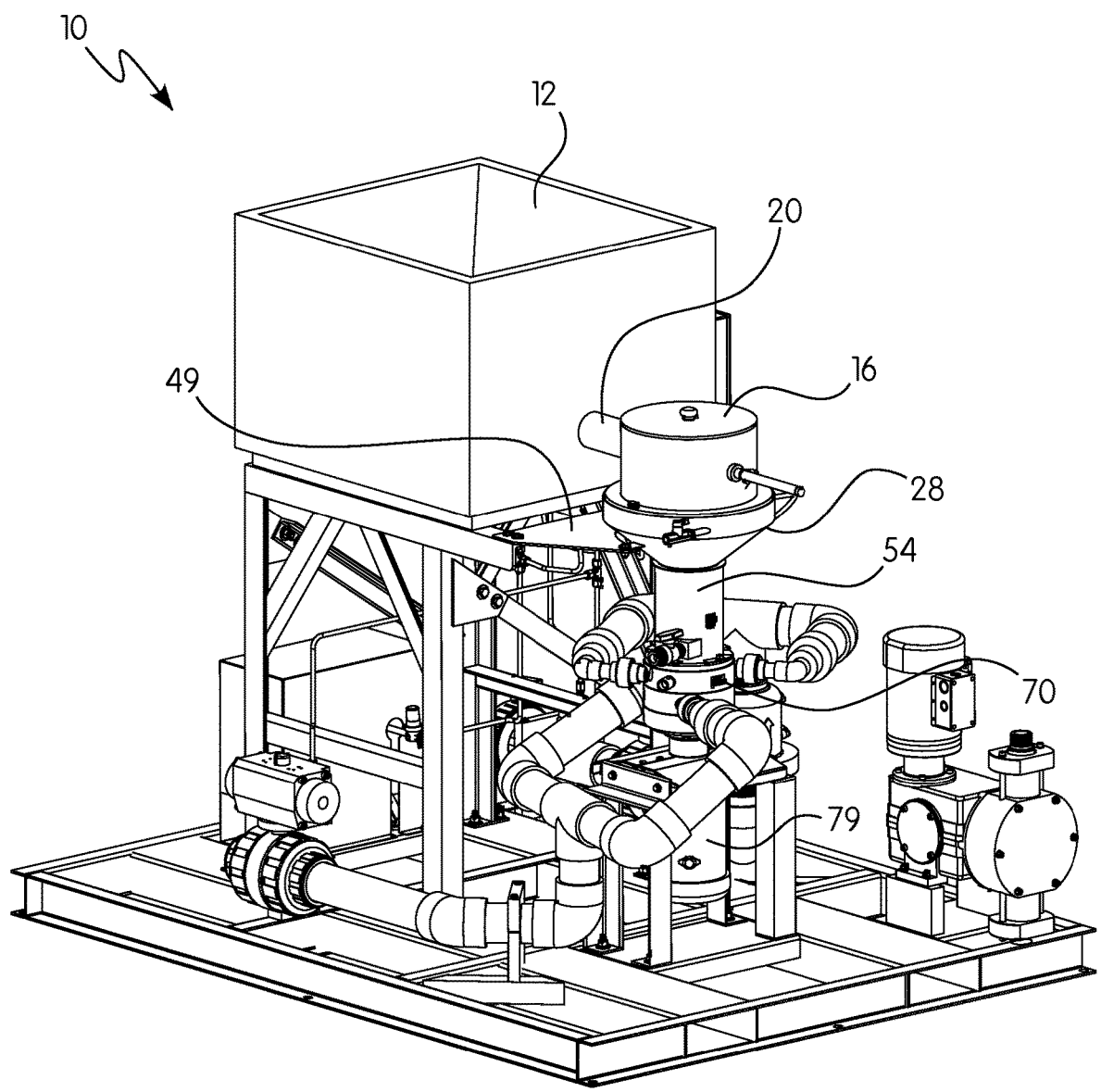
FIG. 1 is a perspective view of a system for preparing a polymeric mixture according to the principles of the present invention.
Figure 2:
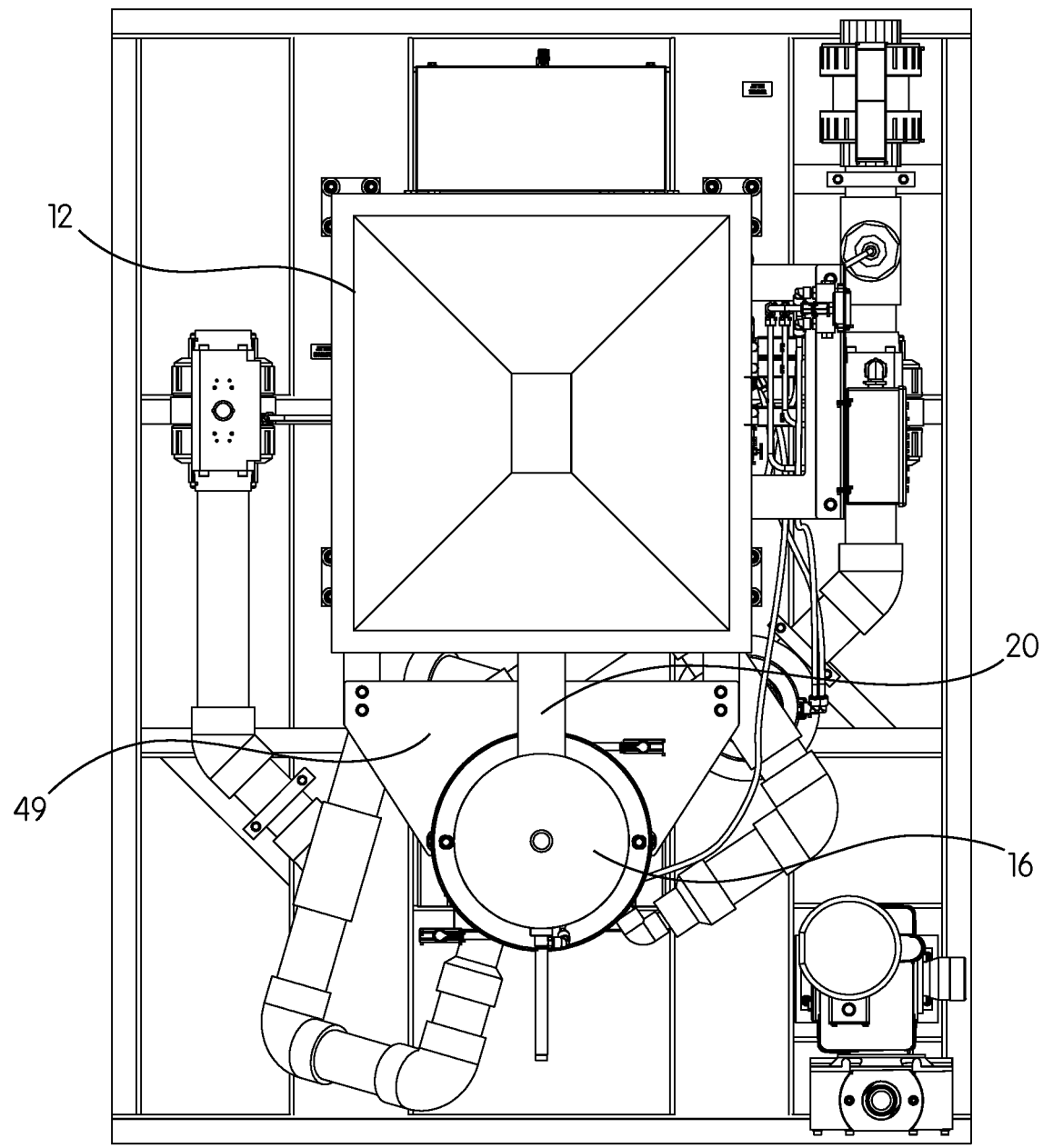
FIG. 2 is a plan view of the system in FIG. 1.
Figure 3:
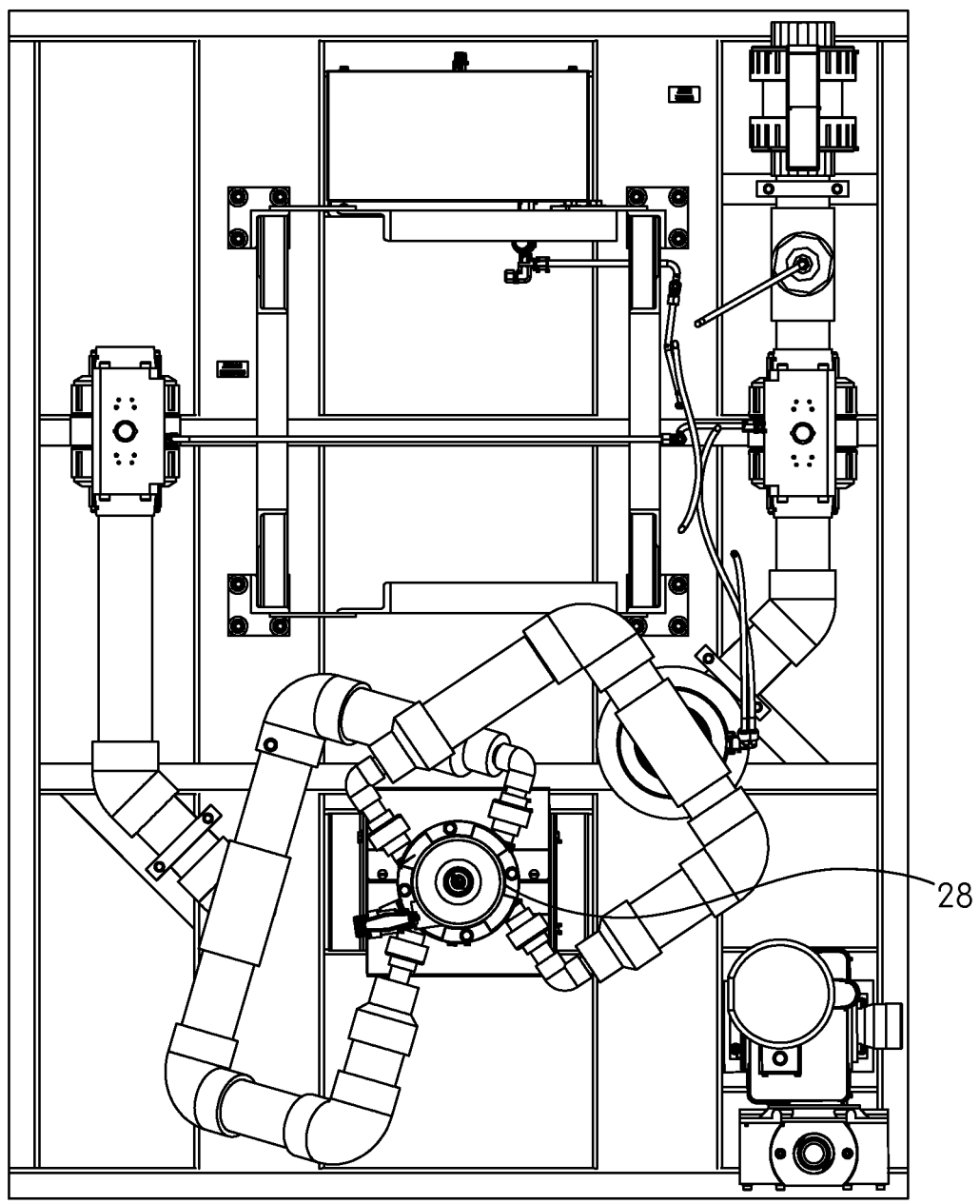
FIG. 3 is a partial cross-sectional plan view of the system in FIG. 1.
Figure 4:
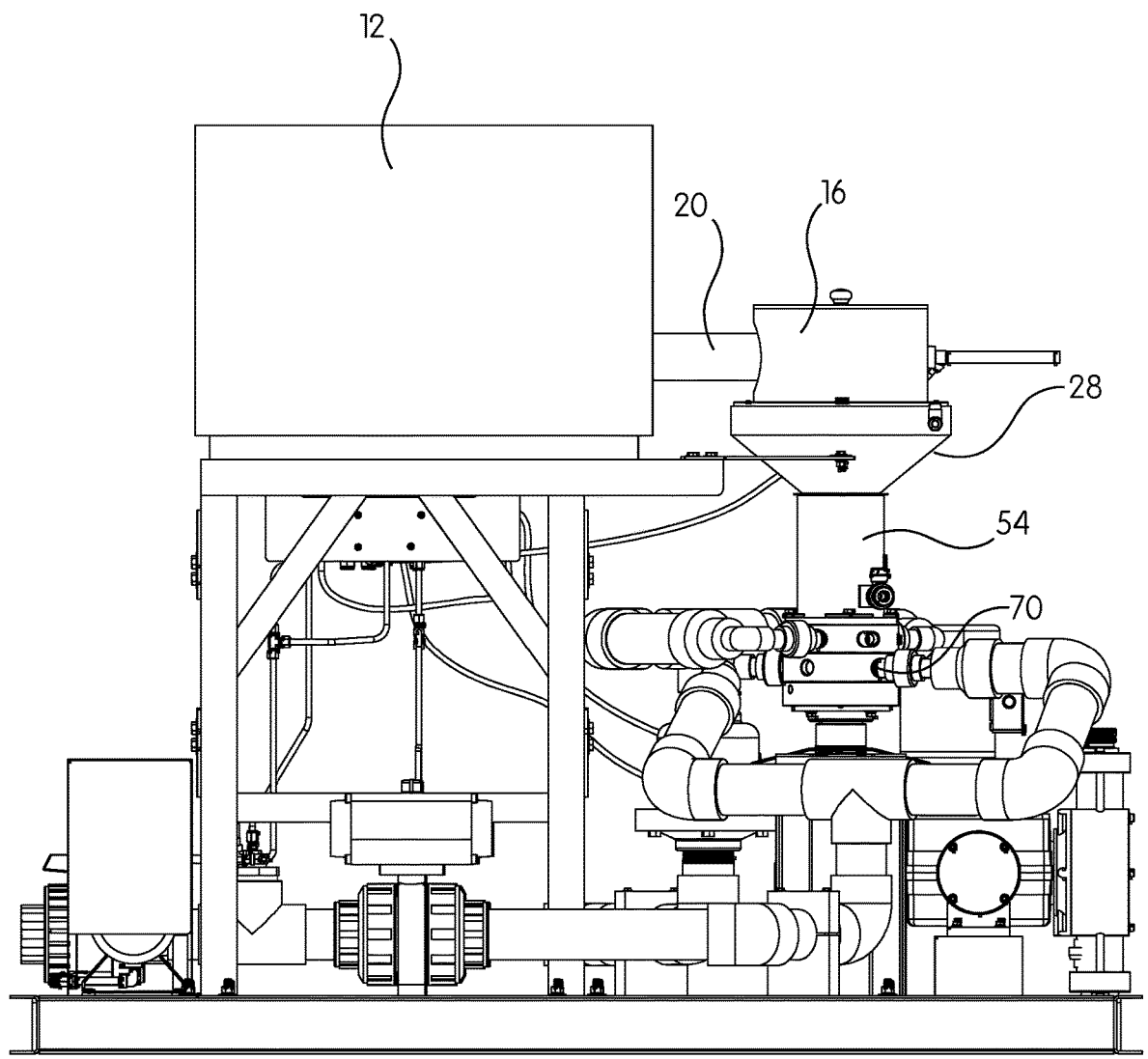
FIG. 4 is a side view of the system in FIG. 1.
Figure 5:
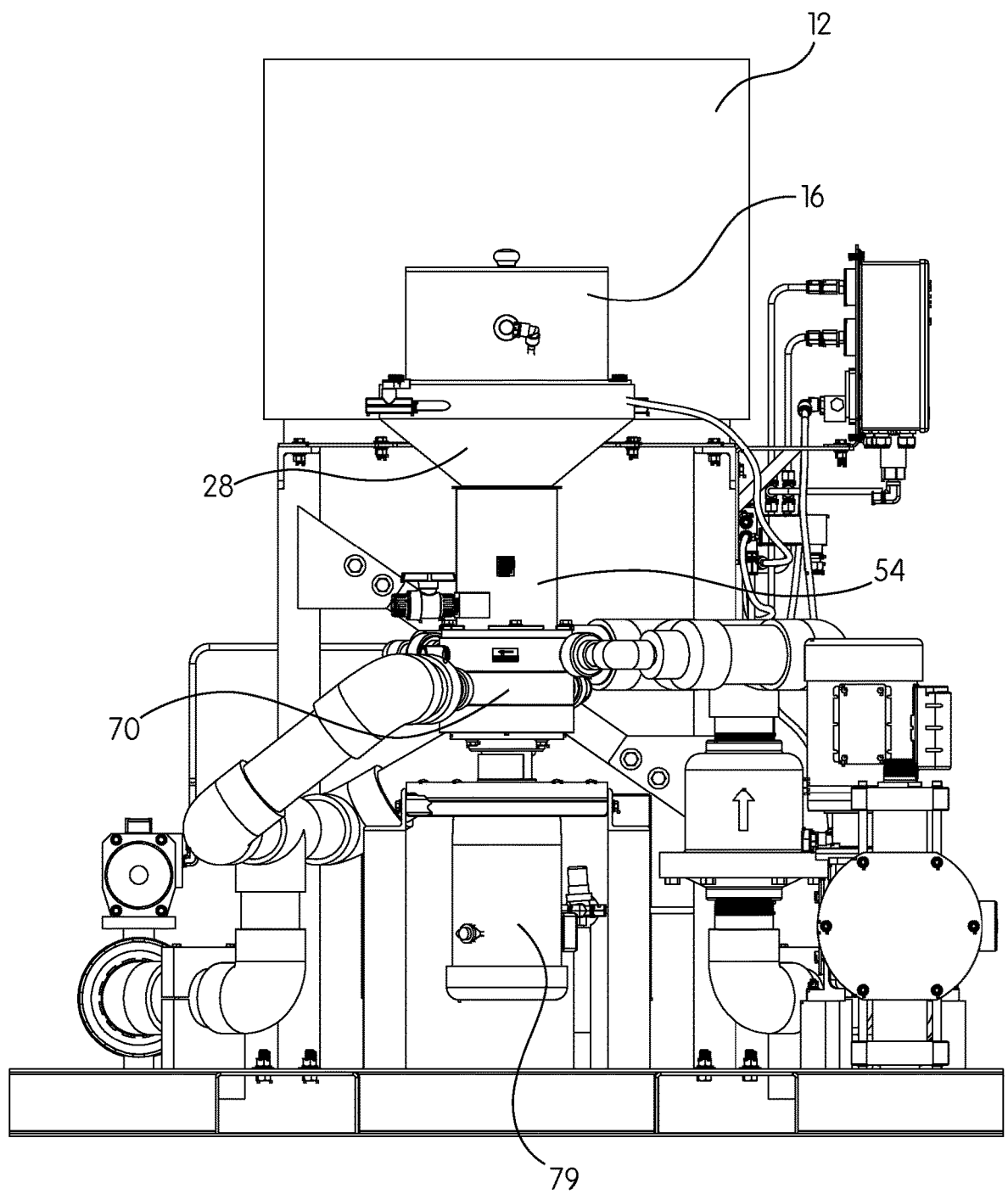
FIG. 5 is a front view of the system in FIG. 1.
Figure 6:
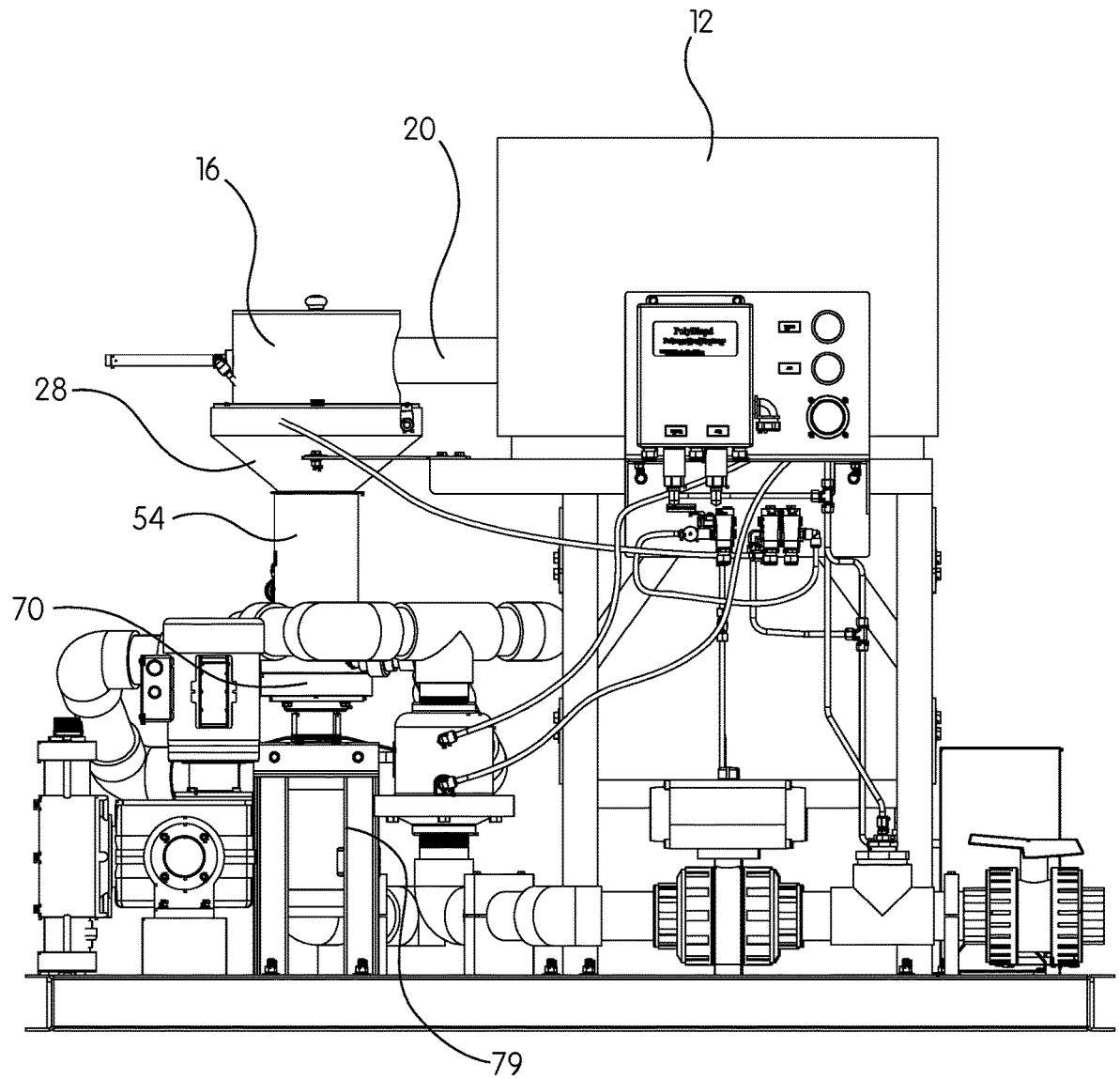
FIG. 6 is an opposite side view of the system in FIG. 1.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, the present invention includes a system for preparing a polymeric mixture using one or more types of polymeric materials. As used herein, "polymer materials" or "polymeric materials" refer to materials that include a polymer. A "polymer" means homopolymers (e.g., prepared from a single monomer species), copolymers (e.g., prepared from at least two monomer species), and graft polymers. Further, as used herein, a "polymeric mixture" refers to a mixture of polymeric materials in a liquid aqueous solvent (i.e., liquid solvent with at least 50 weight % water, such as at least 75 weight % water or 100 weight % water). In some non-limiting embodiments, the polymeric mixture formed by the present invention is a slurry. As used herein, a "slurry" refers to a suspension of insoluble polymeric materials or slightly soluble polymeric materials in an aqueous liquid solvent. The term "slurry", as used herein, is used interchangeably with the term "dispersion". Alternatively, in some non-limiting embodiments, the polymeric mixture formed by the present invention is a solution. As used herein, a "solution" refers to a homogenous mixture of polymeric materials and aqueous liquid solvent in which the polymeric materials are completely soluble in the liquid solvent.

Referring to FIGS. 1-6, and according to one preferred and non-limiting embodiment or aspect, the system 10 includes a containment device 12 that is configured to retain and distribute dry polymeric materials. The phrase "dry polymeric materials" refers to polymer containing materials that comprise less than 5 weight % of inert materials, such as water, based on the total weight of the materials. In some non-limiting embodiments, the dry polymeric materials comprise less than 2 weight % of inert materials, or less than 1 weight % of inert materials, based on the total weight of the materials. Non-limiting examples of dry polymeric materials include dry powder polymeric materials. As used herein, a "powder" refers to a dry solid substance divided into fine, homogeneous particles that are free flowing.

Figure 7:
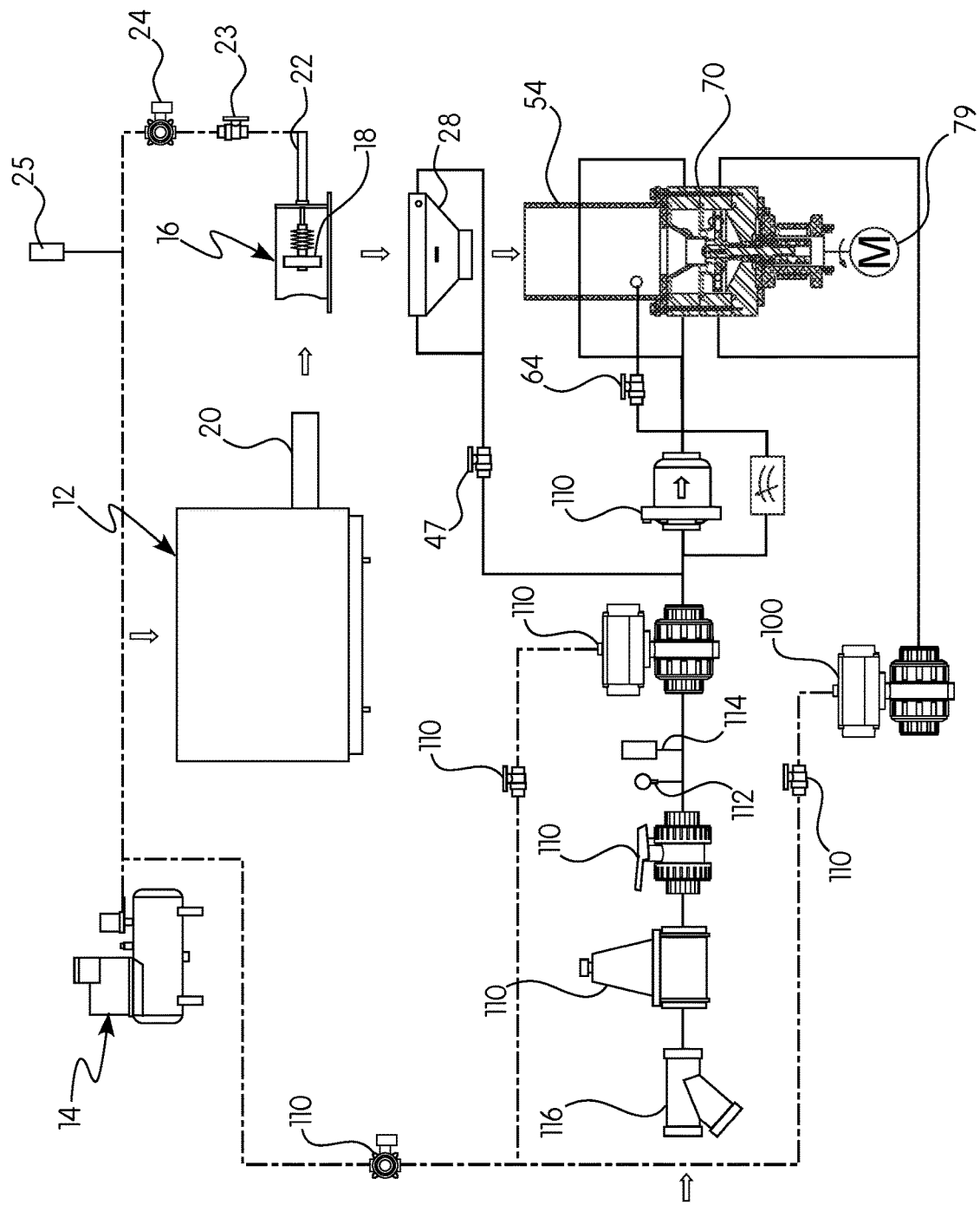
FIG. 7 is a partial cut-away view of the system in FIG. 1.

The containment device 12 used in connection with the present invention can be selected to have any desired size or shape. For example, the containment device 12 can have a square, rectangular, or circular shape that is sized and shaped to hold or contain a desired amount of dry polymeric materials. The containment device 12 can further include a distribution device, such as a cylindrical helix screw, configured to distribute the dry polymeric materials to another component or area within the system 10. The distribution device can be used to control the feed rate of the dry polymeric materials from the containment device 12. As shown in FIG. 7, the distribution device can be operated with an air compressor 14. The distribution device can also be operated with other devices including, but not limited to, an electromechanical device, such as a solenoid or motor, for example.

In certain non-limiting embodiments, and with continued reference to FIG. 7, the containment device 12 is in fluid communication with a receiving chamber 16. As used herein, "fluid communication" refers to the ability of powder or other substances to flow from one component or area to another component or area within the system 10. In some non-limiting embodiments, the containment device 12 is connected to the receiving chamber 16 with a conduit 20 (e.g. a pipe, tube, or the like) such that the containment device 12 is in fluid communication with the receiving chamber 16. The previously-described distribution device can be used to distribute the dry polymeric materials from the containment device 12, through the conduit 20, and into the receiving chamber 16 at a desired feed rate.

As further illustrated in FIG. 7, the receiving chamber 16 includes a retractable shut-off gate 18 that is configured to engage the conduit 20 of the containment device 12 and prevent dry polymeric materials from entering the receiving chamber 16. During operation of the system 10, the retractable shut-off gate 18 automatically disengages the conduit to allow dry polymeric materials to exist in the receiving chamber 16. When the system 10 is not in use, the retractable shut-off gate 18 automatically moves and engages the conduit 20 to prevent back-flow of materials into the receiving chamber 16. The retractable shut-off gate 18 can be controlled with a pneumatic cylinder 22 that is connected to adjustment valves 23, control valves 24, and/or switches 25, as shown in FIG. 7. The receiving chamber 16 can have any desired shape and size provided that the receiving chamber 16 is capable of receiving and distributing dry polymeric materials. The receiving chamber 16 can also be made of various materials including, but not limited to, plastics, metals, and combinations thereof. In some non-limiting embodiments, the receiving chamber 16 has a cylindrical shape and is made of an acrylic based plastic material.

Figure 8:
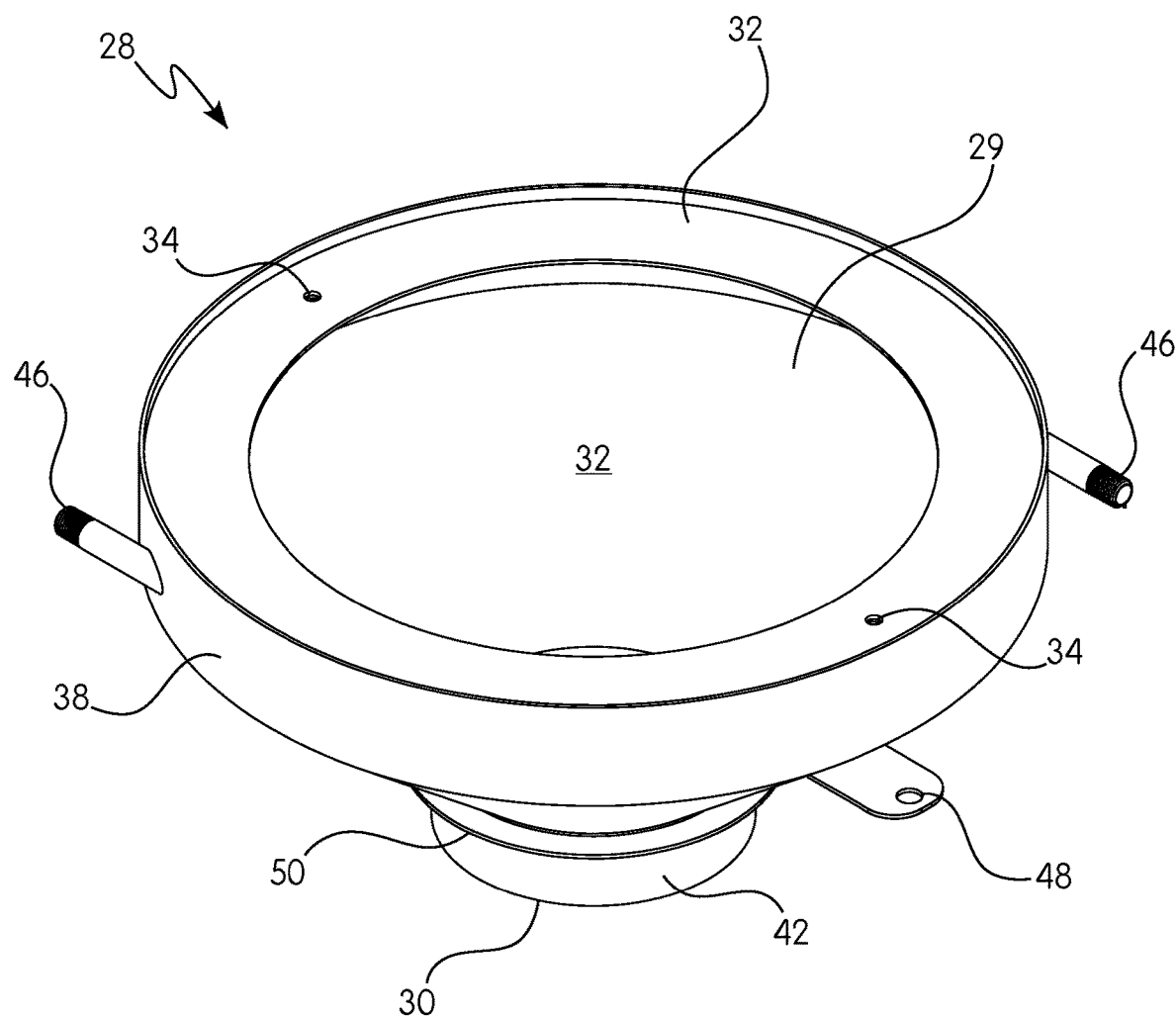
FIG. 8 is a perspective view of a wetting bowl according to the principles of the present invention.

Referring to FIGS. 1-7, the system 10 also includes a wetting bowl 28 that is preferably positioned below the receiving chamber 16. As shown in FIGS. 8-12, the wetting bowl 28 includes an inlet end 29 and an outlet end 30 located opposite the inlet end 29. In some non-limiting embodiments, the inlet end 29 of the wetting bowl 28 is in direct contact with and abuts a bottom surface of the receiving chamber 16. The wetting bowl 28 also includes a central hole 32 formed through the inlet end 29 with a ring 32 that extends around the central hole 32. In certain non-limiting embodiments, one or more orifices 34 are formed through the surface of the ring 32. For instance, and as shown in FIG. 8, two orifices 34 can be formed through the surface of the ring 32 on opposite sides of the wetting bowl 28. The orifices 34 are configured to receive a fastener such as bolts, screws, couplings, and the like to attach the wetting bowl 28 to the receiving chamber 16 such as the receiving chamber 16 shown in FIG. 1.

Figure 11:
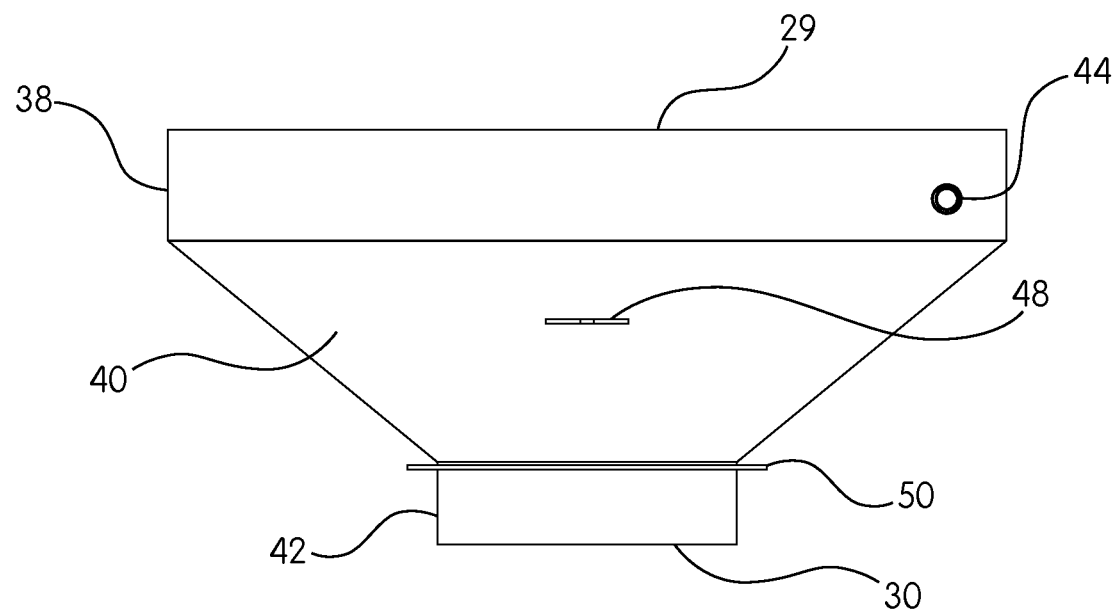
FIG. 11 is a side view of the wetting bowl in FIG. 8.

Referring to FIGS. 8 and 11, the wetting bowl 28 has a first body portion 38 that extends downward from the inlet end 29 and ring 32. In some non-limiting embodiments, the first body portion 38 has a substantially constant inside diameter. As used herein, an "inside diameter" refers to the distance of a straight line that passes through the center of a circular component as measured between two innermost points on the inner walls of that component. Further, a "constant inside diameter of the first body portion" means that the inside diameter throughout the entire height of the first body portion 38, which begins below the ring 32 at the inlet end 29, does not substantially change.

In certain non-limiting embodiments, the first body portion 38 also has a substantially constant outside diameter. As used herein, an "outside diameter" refers to the distance of a straight line that passes through the center of a circular component as measured between two outermost points on the outer walls of that component. Further, a "constant outside diameter of the first body portion" means that the outside diameter throughout the entire height of the first body portion 38 does not substantially change.

As further shown in FIG. 11, the wetting bowl 28 has a second body portion 40 that extends downward from the first body portion 38. In some non-limiting embodiments, the second body portion 40 has a decreasing inside diameter. As used herein, a "decreasing inside diameter of the second body portion" means that the inside diameter of the second body portion 40 continually decreases from one end to the other (e.g., throughout the entire height of the second body portion 40).

In certain non-limiting embodiments, the second body portion 40 also has a decreasing outside diameter. As used herein, a "decreasing outside diameter of the second body portion" means that the outside diameter of the second body portion 40 continually decreases from one end to the other (e.g., throughout the entire height of the second body portion 40). In such embodiments, the second body portion 40 will have a funnel or cone shaped body.

Referring again to FIGS. 8 and 11, the wetting bowl 28 has a third body portion 42 extending from the second body portion 40 to the outlet end 30. In certain non-limiting embodiments, the third body portion 42 has a substantially constant inside diameter. A "constant inside diameter of the third body portion" means that the inside diameter throughout the entire height of the third body portion 42 does not substantially change. When the second body portion 40 has a decreasing inside diameter, the third body portion 42 will have an inside diameter that is smaller than the inside diameter of the first body portion 38.

In some non-limiting embodiments, and as shown in FIGS. 8-12, the third body portion 42 also has a substantially constant outside diameter. A "constant outside diameter of the third body portion" means that the outside diameter throughout the entire height of the third body portion 42 does not substantially change. When the second body portion 40 has a decreasing outside diameter, the third body portion 42 will have an outside diameter that is smaller than the outside diameter of the first body portion 38.

Figure 9:
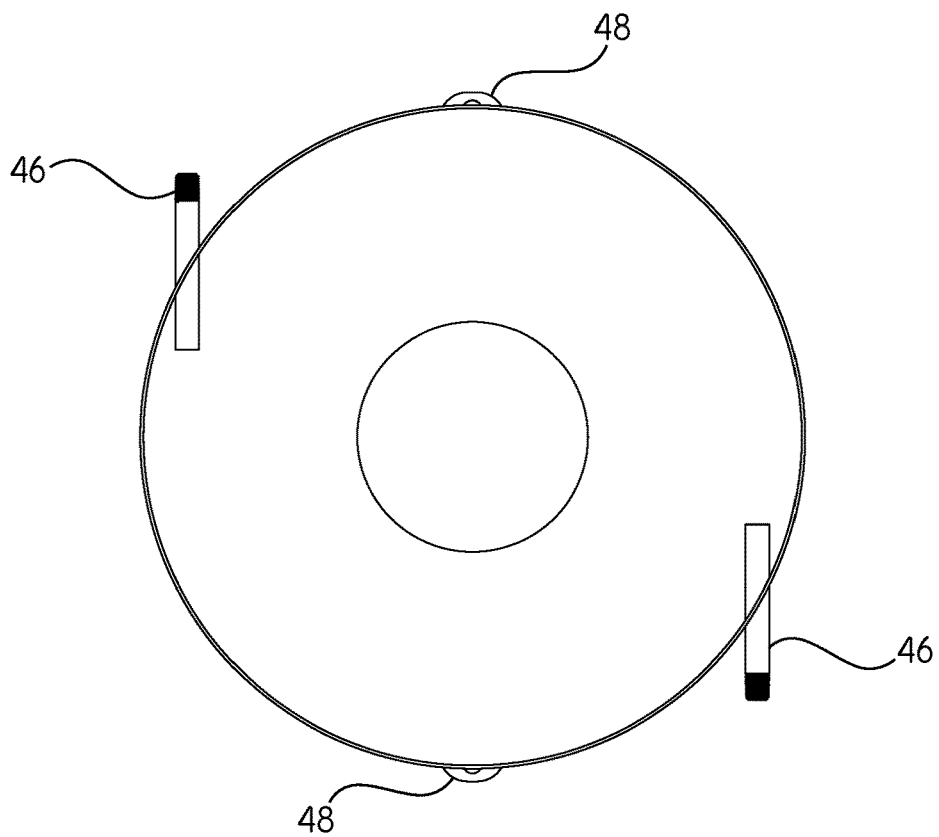
FIG. 9 is a bottom view of the wetting bowl in FIG. 8.
Figure 10:
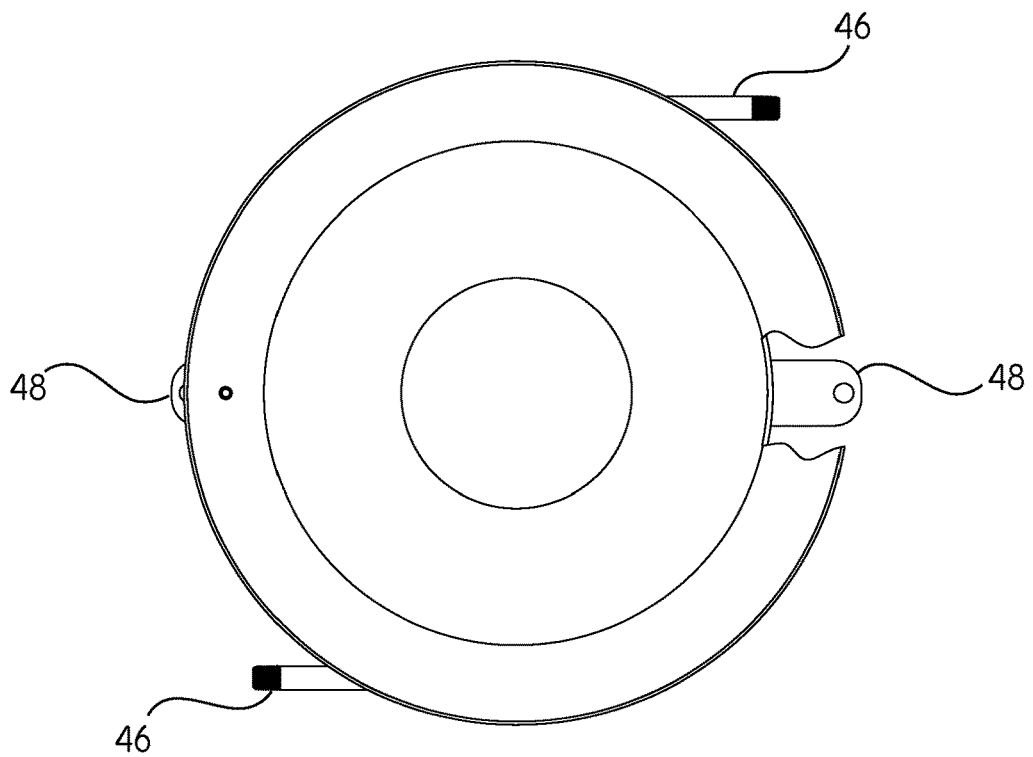
FIG. 10 is a plan view of the wetting bowl in FIG. 8.

In certain non-limiting embodiments, as shown in FIG. 11, the wetting bowl 28 includes water inlet ports 44 that are used to distribute water into the wetting bowl 28. The water inlet ports 44 can be formed through the first body portion 38 of the wetting bowl 28. In some non-limiting embodiments, the wetting bowl 28 comprises at least two water inlet ports 44 formed on opposite sides of the first body portion 38. Referring to FIGS. 8-10, a water connection device 46 can be inserted into the water inlet ports 44. A non-limiting example of a water connection device 46 is a metal fitting nipple. The water connection device 46 can be connected to tubing and/or a flow control valve 47, as shown in FIG. 7, to control the flow of water into the wetting bowl 28.

Figure 12:
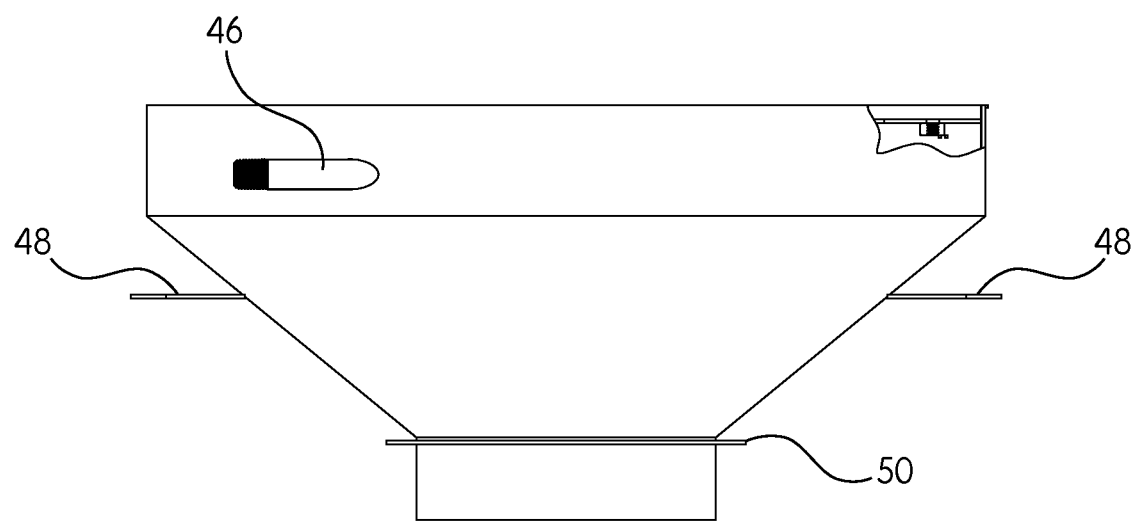
FIG. 12 is an opposite side view of the wetting bowl in FIG. 8.

As shown in FIGS. 8-12, the wetting bowl 28 can also include one or more tabs 48 that extend out from the second body portion 40. In some non-limiting embodiments, the wetting bowl 28 has two tabs 48 that extend out from opposite sides of the second body portion 40. The tabs 48 can be attached to other portions of the system 10 in order to support and stabilize the wetting bowl 28. For example, and as shown in FIG. 1, the tabs 48 can be attached to a platform 49 which, in turn, is attached to other components of the system 10. Referring to FIGS. 8 and 11-12, the wetting bowl 28 can also comprise a secondary ring 50 that extends around the outside perimeter of the third body portion 42. In some non-limiting embodiments, the secondary ring 50 extends around the area where the third body portion 42 meets the second body portion 40.

During operation of the system 10, water is distributed into the wetting bowl 28 through the water inlet ports 44 such that the water flows down onto the inner surfaces of the second body portion 40, through the second and third body portion 40, 42, and out the outlet end 30. As previously described, the second body portion 40 can have a decreasing inside diameter. This design causes the water to flow radially and create a swirling vortex through the second and third body portion 40, 42 of the wetting bowl 28. It was found that the radially flowing water prevents the polymeric materials from agglomerating and aids in the distribution of the polymer materials through the wetting bowl 28.

As shown in FIGS. 1 and 4-7, the system 10 further includes a dispersing channel 54. In some non-limiting embodiments, referring to FIGS. 13-14, the dispersing channel 54 is a conduit (e.g., a pipe) with a first end 56, a second end 58 located opposite the first end 56, and a body 60 extending linearly from the first end 56 to the second end 58. The first end 56 of the dispersing channel 54 can directly contact the wetting bowl 28, such that at least a portion of the third body portion 42 extends into the body 60 of the dispersing channel 54. In some non-limiting embodiments, the first end 56 of the dispersing channel 54 abuts the secondary ring 50 that extends around the outside perimeter of the third body portion 60, such that the third body portion 42 extends into the body 60 of the dispersing channel 54. In such embodiments, water flowing through the wetting bowl 28 sprays out radially from the outlet end 30 onto the inner walls of the dispersing channel 54. The water will then flow down toward the second end 58 of the dispersing channel 54.

It is appreciated that the water flowing through the dispersing channel 54 prevents agglomeration of the polymeric materials and aids in the distribution of the polymeric materials.

Figure 13:
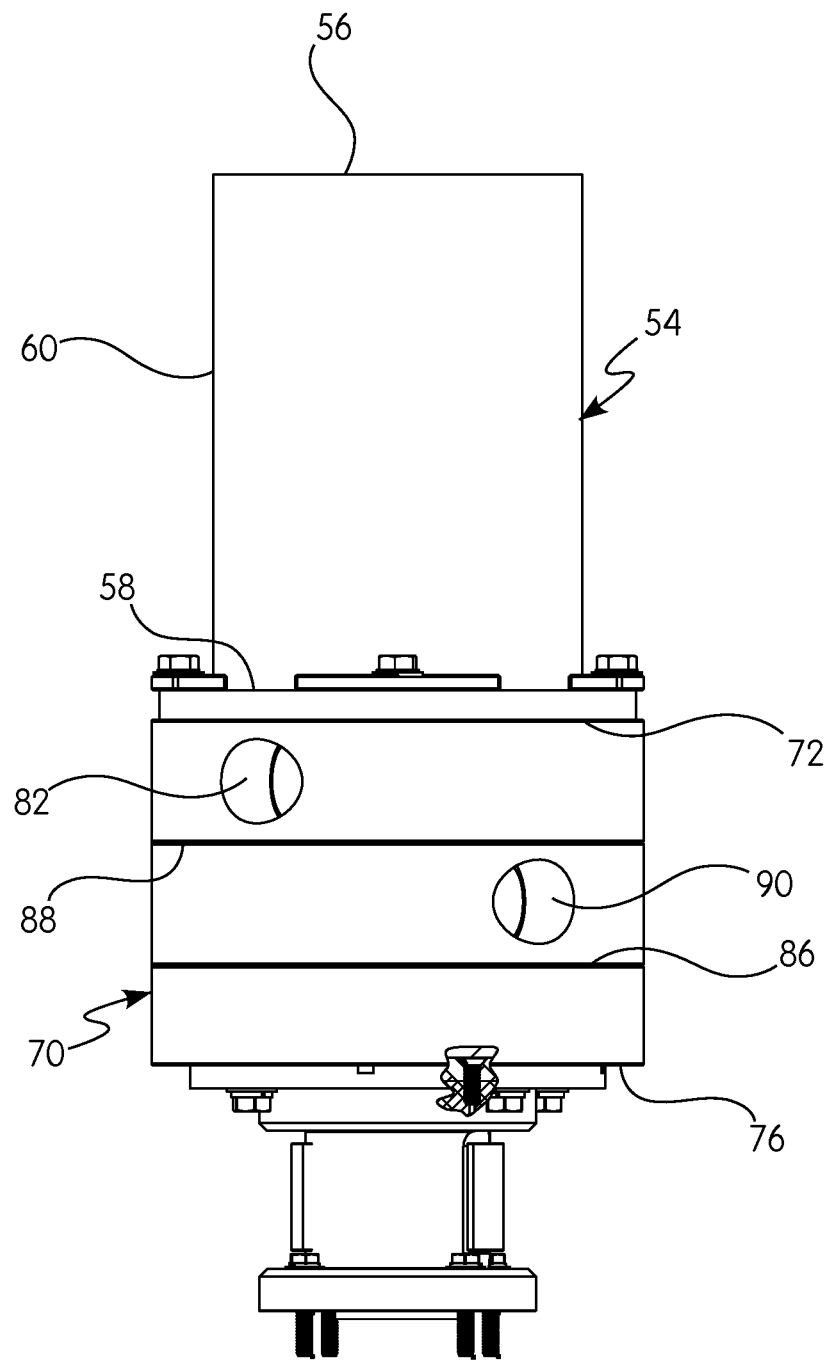
FIG. 13 is a side view of a dispersing channel and mixing chamber according to the principles of the present invention.
Figure 14:
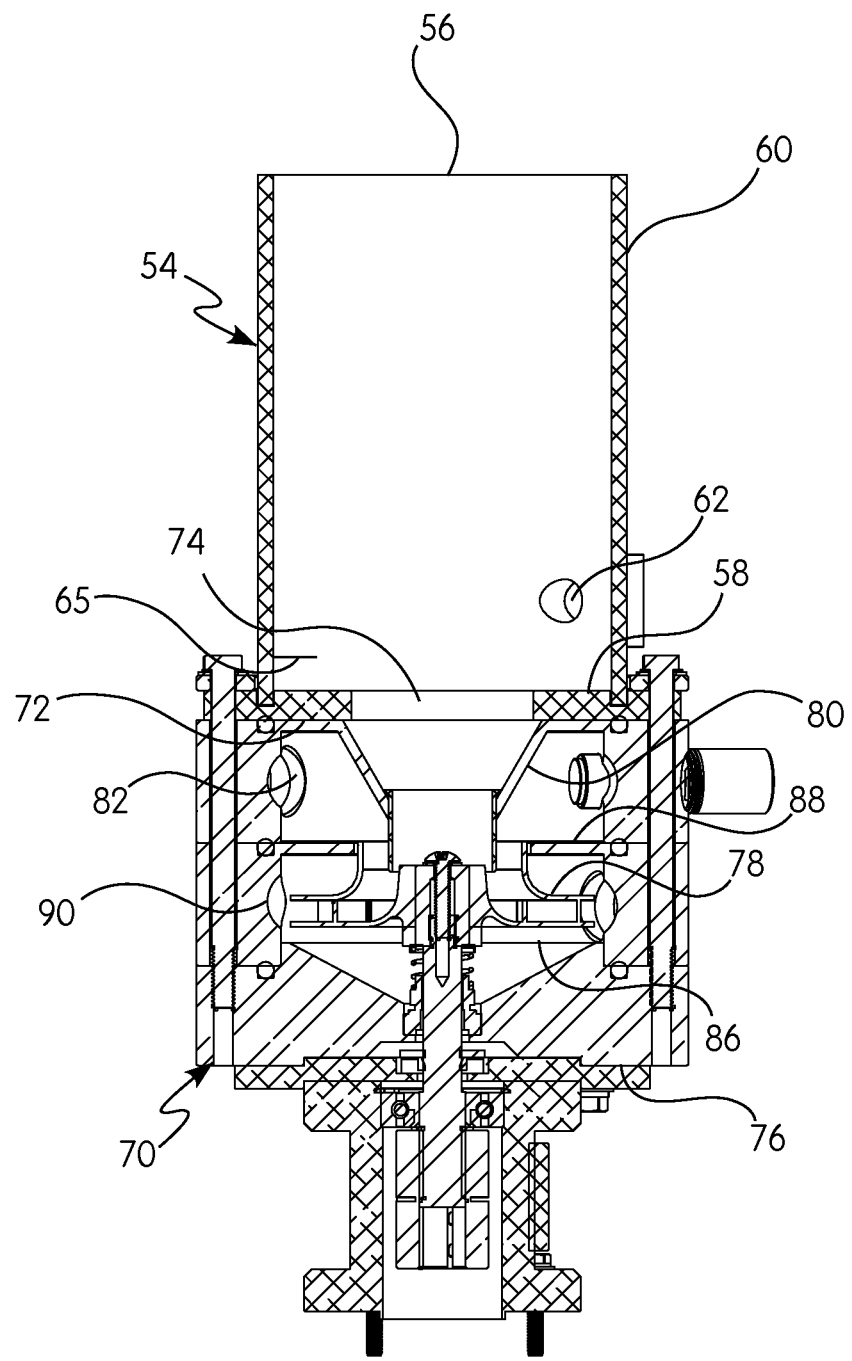
FIG. 14 is a cross-sectional side view of a dispersing channel and mixing chamber according to the principles of the present invention.

In certain non-limiting embodiments, and as shown in FIGS. 13-14, a water inlet port 62 is formed through the body 60 of the dispersing channel 54. The water inlet port 62 is positioned near the second end 58 of the dispersing channel 54. Various components including, but not limited to, flow control valves 64 (see FIG. 7) are associated with the water inlet port 62 to control and monitor the flow of water into the dispersing channel 54. In some non-limiting embodiments, a baffle 65 is positioned below the water inlet port 62 on an opposite side of the dispersing channel 54. The baffle 65 helps distribute water from the water inlet port 62 and at least some of the polymeric materials (e.g., at least some of the dry polymeric materials and/or at least some of the polymeric materials now associated with water molecules) through the second end 58 of the dispersing channel 54.

The dispersing channel 54 can be made of various materials provided that the material allows for water to flow uninterrupted along its surface. In some non-limiting embodiments, the dispersing channel 54 can be made of a plastic material. For example, the dispersing channel 54 can be made of an acrylic-based plastic material. The material that forms the dispersing channel 54 can also be transparent. As used herein, a "transparent material" refers to a material that permits the passage of visible light such that objects on the opposite side may be seen by the human eye. Thus, a dispersing channel 54 made from a transparent material (for example, a transparent acrylic-based plastic material) allows an individual to observe and monitor the distribution of water and polymeric materials.

Referring to FIGS. 1-7, a mixing chamber 70 is connected to and positioned below the dispersing channel 54. In certain non-limiting embodiments, as shown in FIGS. 13-14, the mixing chamber 70 includes a first end 72 having an opening 74, a second end 76 positioned opposite the first end 72, and a mechanical mixing device 78 positioned between the first end 72 and the second end 76. As used herein, a "mechanical mixing device" refers to a device or apparatus that can blend, disperse, and/or combine various materials using the movement of mechanical parts or components. For example, the mechanical mixing device 78 can include a motor 79 (see FIG. 7) and mechanical parts or components that move with the use of the motor 79. In some non-limiting embodiments, the mechanical mixing device 78 includes an impeller or mixing rotor and a motor 79.

Referring to FIG. 14, a funnel shaped distribution apparatus 80 can extend from the first end 72 of the mixing chamber 70. In certain non-limiting embodiments, the funnel shaped distribution apparatus 80 is positioned within the mixing chamber 78, such that at least a portion of the outside diameter of the funnel shaped distribution apparatus 80 decreases from the first end 72 of the mixing chamber 70 to the mechanical mixing device 78. The design of the funnel shaped distribution apparatus 80 causes polymeric materials and water exiting the dispersing channel 54 to flow directly to the mechanical mixing device 78.

As shown in FIGS. 13-14, the mixing chamber 70 also includes at least one water inlet port 82 positioned at the first end 72 of the mixing chamber 70. In some non-limiting embodiments, the mixing chamber 70 includes two water inlet ports 82 that are about 180 degrees apart. The water inlet port 82 is configured to distribute water into the mixing chamber 70 in an area outside of the funnel shaped distribution apparatus 80. After distributing water through the water inlet port 82, the water flows to the mechanical mixing device 78 where it is mixed with the polymeric materials to form a polymeric mixture.

Referring to FIGS. 13-14, a horizontal internal wall 86 is positioned below the mechanical mixing device 78. Horizontal internal wall 86 prevents water and polymeric materials from exiting the mixing chamber 70 so that the mechanical mixing device 70 can thoroughly mix the materials into a polymeric mixture. In certain non-limiting embodiments, the mixing chamber 70 also includes a second horizontal internal wall 88 that is located above the mechanical mixing device 78. Water exiting the water inlet port 82 will, therefore, flow onto the second horizontal internal wall 88. The second horizontal internal wall 88 comprises passages that allows the water to pass through to the mechanical mixing device 78. In such embodiments, the funnel shaped distribution apparatus 80 extends through the second horizontal internal wall 88 to allow the polymeric materials to flow to the mechanical mixing device 78. It is appreciated that horizontal walls 86 and 88 define two separate zones within the mixing chamber 70: (i) a first zone formed between first end 72 and second horizontal wall 88 in which water and polymeric materials are introduced into the mixing chamber 70; and (ii) a second zone formed between second horizontal wall 88 and horizontal wall 86 where water and polymeric materials are mixed together by the mechanical mixing device 78 to form a polymeric mixture.

As further shown in FIGS. 13-14, at least one discharge port 90 is formed through the side of the mixing chamber 70 above horizontal internal wall 86. In some non-limiting embodiments, the mixing chamber 70 includes at least two discharge ports 90 that are positioned about 180 degrees apart. The polymeric mixture can be discharged through the at least one discharge port 90 that is connected to piping that leads to a storage tank. The high energy mixing provided by the mechanical mixing device 78 can create a vacuum that helps pull the polymeric mixture through the discharge port 90 and into the piping. To ensure that the polymeric mixture does not flood the mixing chamber 70, a pneumatic actuated valve 100 and the previously described pneumatic cylinder 22 (see FIG. 7) can be used to help pull the polymeric mixture out of the mixing chamber 70 and through the piping connected to the discharge port 90.

In some non-limiting embodiments, the system 10 includes various other components. For example, and as shown in FIG. 7, the system 10 can include additional valves 110 (e.g., flow control valves, pressure reducing valves, rate adjustment valves, and the like), water pressure gauges 112, water pressure switches 114, and water conduits (e.g., piping) with strainers 116. Further, the system 10 can also be automatically controlled with a controller. Non-limiting examples of controllers include microprocessors, CPUs, and/or other computing devices.

It was found that the system 10 described herein is capable of forming a polymeric mixture while reducing agglomeration of the polymeric materials. The system 10 is also able to use a high capacity of water and polymer to form the polymeric mixture. For example, the system 10 described herein is capable of forming polymeric slurries using 100 gallons per minute (GPM) of water and 20 pounds per minute (lb/min) of dry polymeric materials. It is appreciated that the feed rate of water added to the wetting bowl 28, dispersing channel 54, and mixing chamber 70 is controlled along with the feed rate of the dry polymeric materials to provide a polymeric mixture with a desired concentration.

As indicated, the present invention is also directed to a method of preparing a polymeric mixture. The method can include any of the steps previously mentioned. For example, in certain non-limiting embodiments, the method includes: distributing dry polymeric materials into a receiving chamber 16 from the containment device 12; distributing the dry polymeric materials into a wetting bowl 28 from the receiving chamber 16; distributing the polymeric materials and water from the wetting bowl 28, through the dispersing channel 54, and into the mixing chamber 70; directing the polymeric materials and water to the mechanical mixing device 78 with a funnel shaped distribution apparatus 80 having an outside diameter that decreases from the first end 72 of the mixing chamber 70; transporting water into the mixing chamber 70 with at least one water inlet port 82 formed through a side of the mixing chamber 70 at the first end 72; and mixing the polymeric materials and water with the mechanical mixing device 78 to form a polymeric mixture. The method can include various other steps using the previously described components of the system 10. For instance, the method can further include a step of discharging the polymeric mixture through the at least one discharge port 90 and transporting the discharged polymeric mixture to at least one storage tank where an aging of the polymeric mixture occurs.

Whereas particular embodiments of this invention have been described above for purposes of illustration, it will be evident to those skilled in the art that numerous variations of the details of the present invention may be made without departing from the invention as defined in the appended claims. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A system for preparing a polymeric mixture comprising:
   a containment device configured to distribute dry polymeric materials;
   a receiving chamber in fluid communication with the containment device;
   a wetting bowl connected to the receiving chamber;
   a dispersing channel in fluid communication with the wetting bowl; and
   a mixing chamber connected to the dispersing channel, the mixing chamber comprising: a first end comprising an opening; a second end located opposite the first end; a mechanical mixing device positioned between the first end and the second end; and a discharge port formed through a body of the mixing chamber below the mechanical mixing device and which is connected to piping where a polymeric mixture formed with the mechanical mixing device exits the mixing chamber,
   wherein the dispersing channel comprises a conduit with a first end in direct contact with the wetting bowl, a second end located opposite the first end and which is attached to the mixing chamber, and a body extending linearly from the first end to the second end, wherein a third portion of the wetting bowl extends into the dispersing channel to allow water flowing through the wetting bowl to spray out radially onto an interior wall of the dispersing channel, and wherein the mixing chamber is positioned below the dispersing channel and the first end of the mixing chamber comprising the opening is attached to the second end of the dispersing channel in which the polymeric materials and water exiting the dispersing channel flow directly to the mechanical mixing device.

2. The system of claim 1, wherein the receiving chamber comprises a retractable shut-off gate configured to control the distribution of the dry polymeric materials into the receiving chamber.

3. The system of claim 1, wherein the wetting bowl comprises:
- an inlet end;
- an outlet end positioned opposite the inlet end;
- a first body portion extending from the inlet end, the first body portion having a substantially constant inside diameter;
- a second body portion extending from the first body portion, the second body portion having a decreasing inside diameter; and
- the third body portion extending from the second body portion to the outlet end, the third body portion having a substantially constant inside diameter that is smaller than the inside diameter of the first body portion.

4. The system of claim 3, wherein the wetting bowl further comprises at least two water inlet ports that are formed through the first body portion of the wetting bowl.

5. The system of claim 1, wherein at least a portion of the dispersing channel is made of a plastic material.

6. The system of claim 5, wherein at least a portion of the dispersing channel comprises a substantially transparent plastic material.

7. The system of claim 1, wherein the body of the dispersing channel comprises a water inlet port.

8. The system of claim 7, wherein the body of the dispersing channel further comprises a baffle positioned below the water inlet port of the dispersing channel on an opposite side of the dispersing channel from the water inlet port to distribute water flowing from the water inlet port and at least some of the polymeric materials through the second end of the dispersing channel.

9. The system of claim 1, wherein the mixing chamber further comprises: (1) a first horizontal internal wall positioned below the mechanical mixing device; and (2) a second horizontal internal wall positioned above the mechanical mixing device,
  wherein the second horizontal internal wall comprises passages that allow water to pass through.

10. The system of claim 1, further comprising a funnel shaped distribution apparatus extending from the first end of the mixing chamber that directs the polymeric materials and water exiting the dispersing channel to flow directly to the mechanical mixing device.

11. A method of preparing a polymeric mixture comprising:
- distributing dry polymeric materials into a receiving chamber from a containment device;
- distributing the dry polymeric materials into a wetting bowl from the receiving chamber;
- distributing the polymeric materials from the wetting bowl, through a dispersing channel, and into a mixing chamber comprising a mechanical mixing device, wherein the dispersing channel comprises a conduit with a first end in direct contact with the wetting bowl, a second end located opposite the first end and which is attached to the mixing chamber, and a body extending linearly from the first end to the second end;
- directing the polymeric materials to the mechanical mixing device;
- transporting water into the mixing chamber;
- mixing the polymeric materials and water with the mechanical mixing device to form a polymeric mixture; and
- discharging the polymeric mixture through a discharge port formed through a body of the mixing chamber below the mechanical mixing device; and
- transporting the polymeric mixture away from the mixing chamber through piping connected to the discharge port,
  wherein a third portion of the wetting bowl extends into the dispersing channel and at least a portion of the water exiting the wetting bowl radially sprays onto an interior wall of the dispersing channel, and
  wherein the mixing chamber is positioned below the dispersing channel and a first end of the mixing chamber comprising an opening is attached to the second end of the dispersing channel in which the polymeric materials and water exiting the dispersing channel flow directly to the mechanical mixing device.

12. The method of claim 11, wherein a retractable shut-off gate is automatically opened to allow the dry polymeric materials into the receiving chamber.

13. The method of claim 11, wherein the wetting bowl comprises:
- an inlet end;
- an outlet end positioned opposite the inlet end;
- a first body portion extending from the inlet end, the first body portion having a substantially constant inside diameter;
- a second body portion extending from the first body portion, the second body portion having a decreasing inside diameter; and
- a third body portion extending from the second body portion to the outlet end, the third body portion having a substantially constant inside diameter that is smaller than the inside diameter of the first body portion.

14. The method of claim 13, further comprising transporting water into the wetting bowl through at least two water inlet ports that are formed through the first body portion of the wetting bowl.

15. The method of claim 11, further comprising distributing water into the dispersing channel through a water inlet port positioned through a body of the dispersing channel.

16. The method of claim 15, wherein at least a portion of the water distributed through the water inlet port of the dispersing channel and at least some of the polymeric materials flows over a baffle and into the mixing chamber, wherein the baffle is positioned on an opposite side of the dispersing channel from the water inlet port.

17. The method of claim 11, wherein the mixing chamber further comprises: (1) a first horizontal internal wall positioned below the mechanical mixing device; and (2) a second horizontal internal wall positioned above the mechanical mixing device,
  wherein the second horizontal internal wall comprises passages that allow water to pass through.

18. The method of claim 11, further comprising a funnel shaped distribution apparatus extending from the first end of the mixing chamber that directs the polymeric materials and water exiting the dispersing channel to flow directly to the mechanical mixing device.

\* \* \* \* \*